Patented May 10, 1927.

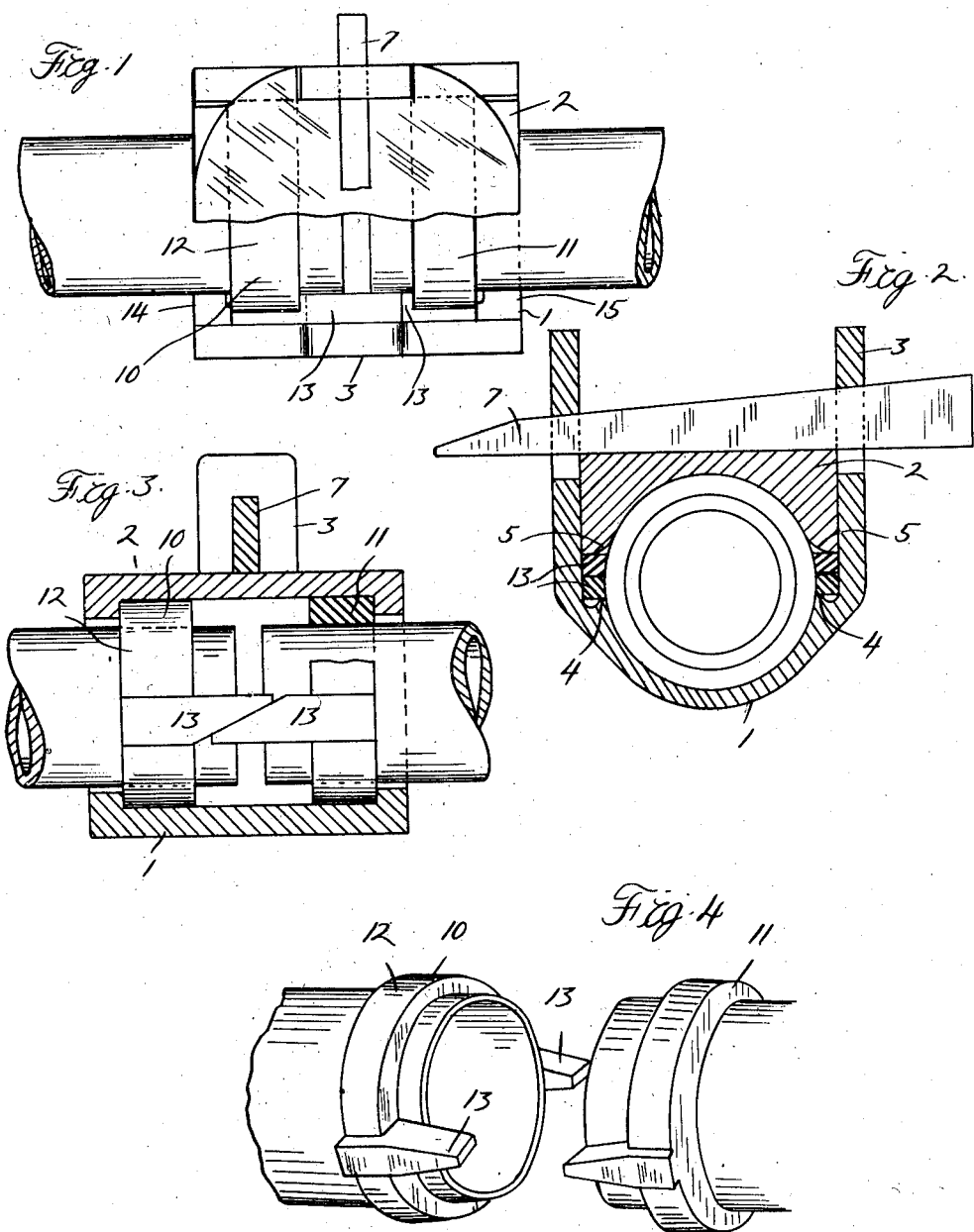

1,628,132

UNITED STATES PATENT OFFICE.

ALBIN FARNSTROM, OF DETROIT, MICHIGAN, ASSIGNOR OF FORTY-FIVE ONE-HUNDREDTHS TO STANLEY FONS, OF ROYAL OAK, MICHIGAN.

PIPE COUPLING.

Application filed September 24, 1924. Serial No. 739,671.

The invention relates to pipe couplings and has for one of its objects the provision of a pipe coupling which may be cheaply manufactured and readily applied and which will effectively seal the gap between the adjacent ends of the pipes. Another object is the provision of an improved coupling for pipes permitting of relative angular movement of these pipes.

Further objects of the invention reside in the novel features of construction and combinations and arrangements of parts as more fully hereinafter set forth.

In the drawings:

Figure 1 is a plan view, partly broken away, of a pipe coupling embodying my invention;

Figure 2 is a cross section on the line 2—2 of Figure 1;

Figure 3 is a longitudinal sectional elevation through the pipe coupling;

Figure 4 is a perspective view of adjacent ends of a pair of pipes showing the packing members.

1 and 2 are cooperating lower and upper segmental clamping sections of the pipe coupling, the former having the substantially parallel upwardly extending ears 3 and the inner longitudinally extending shoulders 4 at its opposite sides. The clamping section 2 is engageable between the ears 3 and has the longitudinally extending shoulders 5 at its opposite sides adapted to cooperate with the shoulders 4 of the clamping section 1. This clamping section 2 also has the spaced transversely extending ears 6 at opposite sides of its upper portion and embracing the ears 3 of the clamping section 1. The clamping sections are suitably secured to each other as by means of the tapered key 7 which extends through the ears 3 of the clamping section 1 and engages the top of the clamping section 2.

For the purpose of sealing the gap between the adjacent ends of the pipes 8 and 9, which extend loosely between the clamping sections 1 and 2, I have provided the cooperating packing members 10 and 11, each of which has the same construction, and comprises the ring 12 surrounding the adjacent end of its respective pipe and the transverse projections 13 at its opposite sides extending longitudinally of the pipe and having their outer edges located radially outward beyond the periphery of the ring. The transverse projections of one clamping member overlap the transverse projections of the other clamping member and these overlapping projections are clamped together between the longitudinal shoulders of both clamping sections so that the fluid, such as water, passing through the pipes cannot escape between the sides of the clamping section 2 and the ears 3 of the clamping section 1. Since the clamping sections firmly engage the rings of the packing members and hold the same in firm contact with their respective pipes the fluid cannot escape longitudinally of the pipes between the clamping sections and the pipe. Therefore the gap between the adjacent ends of the pipes is effectively sealed.

For the purpose of permiting relative angular movement of the pipes to take care of depressions or projections of the ground or to take care of bends in the pipe line, the packing members 10 and 11 are formed of some flexible material such as rubber so that the gap between the ends of the pipes will remain sealed but they can be moved angularly relative to each other.

To hold the packing members from movement longitudinally of the pipes and away from the gap between the ends, I have provided the inwardly extending transverse ribs 14 and 15 near opposite ends of each of the pipe sections 1 and 2 and extending between the longitudinal shoulders, these ribs being positioned to engage the outer edges of the rings of the packing members.

What I claim as my invention is:

1. In a pipe coupling, the combination with a clamping section having longitudinally extending shoulders at its opposite sides, of a cooperating clamping section having longitudinally extending shoulders at its opposite sides, said sections surrounding adjacent ends of a pair of pipes and means for sealing the gap between the adjacent ends of the pipes including a unitary packing member surrounding the end of one of the pipes and a separately formed unitary packing member surrounding the end of the other of the pipes and provided with transverse projections at its opposite sides overlapping the first-mentioned packing member and engageable between the shoulders of said clamping sections.

2. In a pipe coupling, the combination with a clamping section having longitudinally extending shoulders at its opposite sides, of a cooperating clamping section having longitudinally extending shoulders at its opposite sides, said sections surrounding adjacent ends of a pair of pipes and means for sealing the gap between the adjacent ends of the pipes including separately formed packing members having ring portions surrounding the adjacent ends of the pipes and detachably overlapping portions engageable between the longitudinally extending shoulders of said clamping sections.

3. In a pipe coupling, the combination with a clamping section having longitudinally extending shoulders at its opposite sides, of a cooperating clamping section having longitudinally extending shoulders at its opposite sides, said sections loosely surrounding adjacent ends of a pair of pipes, and means for sealing the gap between the adjacent ends of the pipes and permitting relative angular movement of the pipes, said means including a unitary packing member surrounding an end of one of the pipes and a separately formed second packing member surrounding the end of the other of the pipes and provided with flexible transverse projections freely overlapping the first-mentioned packing member and engageable between the shoulders of said sections.

4. In a pipe coupling, the combination with a segmental clamping section having longitudinally extending shoulders at its opposite sides, and transverse inwardly extending ribs near its opposite ends and extending between said shoulders, of a cooperating segmental clamping section having longitudinally extending shoulders at its opposite sides and transverse ribs near its oppoiste ends extending between said shoulders, said sections surrounding adjacent ends of a pair of pipes, a unitary packing ring between the two said clamping sections slidable upon the end of one of the pipes and engageable with the transverse ribs upon said clamping sections and a separately formed unitary packing ring between said clamping sections slidable upon the end of the other of the pipes and engageable with the transverse ribs at the opposite ends of said sections, said second-mentioned packing ring having transverse portions freely overlapping said first-mentioned packing ring and engageable between the shoulders of said clamping sections.

5. In a pipe coupling, the combination with a clamping section, of a cooperating clamping section, said sections surrounding a pipe line having an opening therein, and means for sealing the opening including a unitary packing member between said sections and the pipe line at one end of the opening and a separately formed second packing member between said sections and the pipe line at the other end of the opening, said second packing member having portions freely overlapping said first-mentoned packing member.

6. The combination with a segmental clamping section engageable with a pipe and having oppositely positioned ears extending from its edges, of a cooperating clamping section engageable with the opposite side of the pipe and engageable between said ears and having spaced transversely extending ears engageable on opposite sides of said first mentioned ears, means engageable with said first mentioned ears and cooperating clamping section and extending transversely thereof for forcing said sections toward each other, and sealing means between one of said clamping sections and the pipe.

7. In a pipe coupling, a segmental clamping section, provided with longitudinal shoulders on its inner face and intermediate thereof, a complementary clamping section telescoping within said first section, with the forward edges thereof adjacent said shoulders, said sections surrounding the adjacent ends of two pipes, packing members, and means extending across the second clamping section and engaging opposite side portions of the first clamping section for securing said sections together for engaging said packing members between said shoulders and the edges of said second section.

8. In a pipe coupling, the combination with a pair of clamping sections each having longitudinally extending clamping shoulders at its opposite sides, said sections being engageable with adjoining pipe ends, of a pair of separately formed packing rings disposed between said clamping sections, and each slidable upon one of said pipe ends, and two pairs of packing members, each pair projecting from one of said rings toward the other, said members having beveled engaging ends engageable between said clamping sections, and adapted to be pressed into sealing engagement by said sections.

9. In a pipe coupling, the combination with a pair of complementary clamping sections adapted to receive between them the ends of adjoining pipes, said sections having cooperating pairs of clamping shoulders and one of said sections having at the outer sides of its clamping shoulders, a pair of projecting lugs adapted to embrace the other section, packing means engaged between the clamping shoulders of the two sections, and a clamping member engaging said lugs, and bearing upon the section between said lugs to subject it to a clamping pressure toward the other section.

In testimony whereof I affix my signature.

ALBIN FARNSTROM.